UNITED STATES PATENT OFFICE.

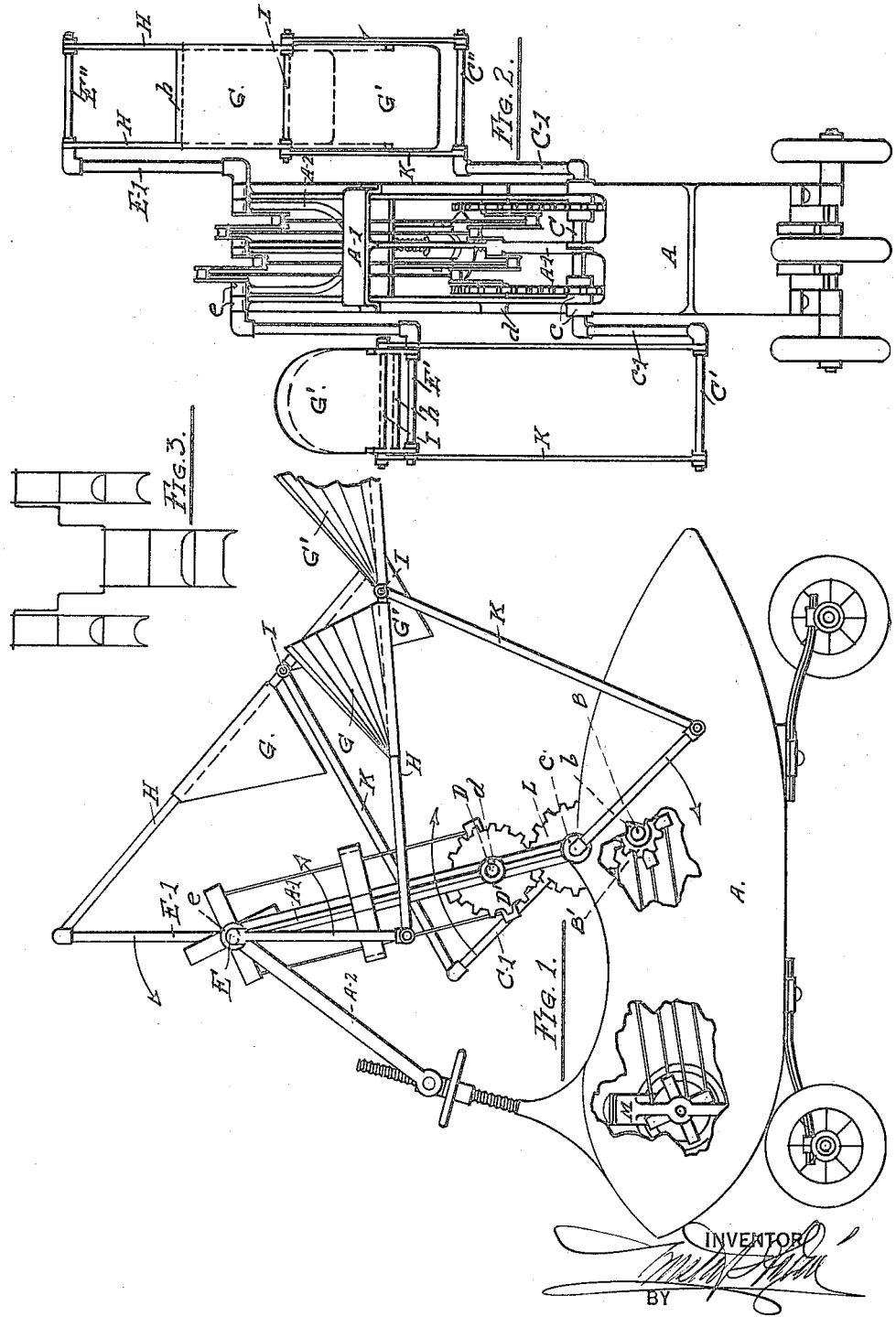

GUSTAF HEDÉN, OF NEW YORK, N. Y.

BUOYING AND DRIVING MECHANISM FOR FLYING MACHINES.

1,426,870.  Specification of Letters Patent.  Patented Aug. 22, 1922.

Application filed May 12, 1921. Serial No. 468,948.

*To all whom it may concern:*

Be it known that I, GUSTAF HEDÉN, a citizen of the United States, and resident of New York city, in the county of New York and State of New York, have invented certain new and useful Improvements in Buoying and Driving Mechanism for Flying Machines, of which the following is a specification.

This invention relates to improvements in flying machines and has for its object to provide a buoying and driving mechanism having wings carried by rotatable and oscillatable frames which are controlled and operated by the cranks of two separate, horizontal and parallel crank shafts which rotate at same angular speed but in opposite directions, the upper one in a direction from above-forward and the lower one from above-backward.

Another object is to provide certain improvements in form, construction and arrangement of the several parts whereby the above and other objects may be effectively carried out.

A practical embodiment is represented in the accompanying drawings in which,

Figure 1 represents in side elevation, a flying machine which includes my improved construction.

Fig. 2 represents a rear elevation of the same.

Fig. 3 represents a detail plan view of an upper crank shaft carrying balanced wings in three wing frames.

The body of the machine is composed of three parts, the car A which is connected to the frame piece A—1 by shaft C, which is journaled in the adjoining bearings of both. Frame piece A—1 is also connected to frame piece A—2 by shaft E which, likewise, is journaled in the adjoining bearings of both. Frame piece A—2 is, besides, adjustably connected to a threaded rod, fast on and protruding upward from the front end of the car A, by means of a threaded nut which is journaled in a sleeve provided with two oppositely disposed pins, journaled in bearings at the lower end of frame piece A—2.

By this construction the car A may be properly balanced by throwing its centre of gravity forward or backward to suit conditions.

The car A and the two frame pieces A—1 and A—2 singly or collectively furnish bearings $b$, $c$, $d$ and $e$, in which are journaled gear and crank shafts B, C, D and crank shaft E, respectively.

Crank shaft E and gear and crank shaft C are each provided with two, long, oppositely disposed, radial and parallel crank arms E—1 and C—1, respectively, all of same radius. The crank pins E' and E'' are journaled in the bearings at one end of wing frames H—$h$, composed of a rigid spacer $h$, fast to two rods H which have secured between them sheets of silk, canvas or flexible material which forms the wings G and G'. Each of the wings G has one side fast on the spacer $h$ and, like G', two of its sides secured to the arms H in such manner that the rear edge remains loose.

By this construction the wing, when in use, will have a tendency to form a scoop, and to evade the air by falling in its frame, when it is moved upward, as shown in Figs. 1 and 2. The wings are arranged in pairs between the arms H and the rear wing G' has its front edge secured to shaft I on which are journaled the rear bearings of the arms H as well as the upper bearings of the guide arms K, the lower bearings of which are journaled on the crank pins C' or C'', respectively.

The rotation and oscillation of the wing frames are controlled and operated as follows.

The motors M transmit power to shaft B to which they are connected by crank and rod connections turning this shaft and its two gears B' in a direction from above-forward, thence from the gears B' to the larger gears L and from the gears L to like gears D' on shaft D, which by crank and rod connections to shaft E turns it in the direction, shown in Fig. 1, and which rotation is in a direction opposite to that of shaft C.

As the two shafts E and C have one crank each on the same side of the machine and these cranks rotate in opposite directions while their crank pins are linked together by the wing frames H—$h$, shafts I and guide arms K, the wing frames are forced to rotate and oscillate in a manner similar to that of the wings of a bird in flight, thus enabling the wings to compress the air on the downward movement and by reason of their flexibility as well as the looseness of their rear edges to evade the air on the upward movement.

A machine having crank shafts of the construction, shown in Figure 3, is controlled and operated in a similar manner.

Steering in the horizontal plane is attained by the operation of rudders, placed at the rear of the car in such positions as will enable them to catch the air currents thrown by the descending wings.

Steering in the vertical plane may be accomplished by the increase or decrease in the speed of the motors.

What I claim is,

A flying machine comprising an adjustable body, upper and lower, horizontal and parallel crank shafts mounted therein, rotatable in opposite directions at the same angular speed, oppositely disposed, radial and parallel cranks on said crank shafts, guiding frames joined at their lower ends to said lower cranks, flexible wings with loose rear edges mounted in frames, said frames rotatable and oscillatable between the crank pins of the upper crank shaft and the upper end of said guiding frames, said wing frames connected to said upper cranks at their upper ends and to said guiding frames at their lower ends, means for adjusting the balance of the body, means for rotating the two crank shafts at same angular speed in opposite directions, and for rotating and oscillating the frames between the opposing crank pins of the two crank shafts.

Signed at New York city, in the county of New York and State of New York this 10th day of May A. D. 1921.

GUSTAF HEDÉN.